United States Patent [19]

Li

[11] Patent Number: 4,547,715

[45] Date of Patent: Oct. 15, 1985

[54] CURRENT CONTROL CIRCUIT

[75] Inventor: Edward Li, Roselle, Ill.

[73] Assignee: Motorola, Inc., Schaumburg, Ill.

[21] Appl. No.: 629,148

[22] Filed: Jul. 9, 1984

[51] Int. Cl.$^4$ ............................................. H02P 5/12
[52] U.S. Cl. .............................. 318/345 B; 318/331;
318/345 F; 361/31
[58] Field of Search ........... 318/317, 341, 434, 345 B,
318/345 F, 331; 361/30, 31, 79, 87, 91, 93, 101

[56] References Cited

U.S. PATENT DOCUMENTS

| | | | |
|---|---|---|---|
| 3,538,426 | 11/1970 | Jones | 361/101 X |
| 3,643,151 | 2/1972 | Matsushima et al. | 361/91 X |
| 4,177,492 | 12/1979 | Noddings et al. | 361/93 X |
| 4,359,652 | 11/1982 | Jarrett et al. | 361/91 X |

Primary Examiner—Ulysses Weldon
Attorney, Agent, or Firm—Steven G. Parmelee; Donald B. Southard

[57] ABSTRACT

An overcurrent protection circuit for inductive loads such as motors is provided. A source voltage is input to a divider circuit including semiconductor switching devices. The inductive load is also connected to the voltage source through the divider circuit. A voltage output from the divider circuit which is proportional to the current through the inductive load is input to a comparator circuit. Another input to the comparator circuit comprises a reference voltage selected to correspond to the maximum desired current through the inductive load. If the comparator circuit senses that the current through the inductive load is greater than the predetermined maximum current, it provides an output to a pulse generator device. The output from the pulse generator device is input to a switching circuit which can cut off the voltage source supply to the inductive load.

4 Claims, 3 Drawing Figures

CURRENT CONTROL CIRCUIT

BACKGROUND OF THE INVENTION

The present invention relates to a circuit for limiting the maximum current to an inductive load such as a motor. More particularly, the present invention provides a switching circuit for disconnecting the voltage supply to a motor when the current through such motor exceeds a predetermined maximum value.

In motor control applications, usually semiconductor switching devices must be selected to protect the worst case of current draws while the motor is stalled. The stall currents could vary as much as three to one (3:1) ratio at the temperature extremes. This requires the selection of semiconductors larger and more expensive than necessary to protect the worst stall current at cold temperatures. Current limit techniques are therefore incorporated in these applications, so the size of the switching devices can be limited to handle the required stall torque. (Stall current is linearly proportional to stall torque). Accordingly, any semiconductor device protecting such motor would have to be large enough and have adequate heat sink capability to handle such current. Typically such a protection scheme is called a linear method of protection where the semiconductor device would be in series with the motor.

In connecting such semiconductor devices with the motor circuit, caution must be utilized less the desired protection not be provided. For example, if the semiconductor device is connected between the voltage source and the battery, typically a sensing resistor must be utilized in the semiconductor circuit to measure the voltage. When in such arrangement the sensing resistor is placed on the voltage source supply side of the motor, a common mode voltage problem results which would require complicated circuitry to detect any overloading. If one of the motor brushes are connected to the motor case, and the sensing resistor is placed on the ground side of the motor supply, the motor case itself must be floated from ground. Accordingly, any short from the ground to the motor case would overload the protecting semiconductors as the current limiting sensing resistor would be by-passed.

Another method of protecting motors from overcurrent is a switching method wherein the inductive load or motor would be switched off when a predetermined current level is reached. Upon the decaying of the current to a lower predetermined value, the supply would again be connected to the motor. The output semiconductor protection devices in series with the motor supply would be either in a saturation or cutoff mode. One problem with such switching method is that upon such occurrence as shorting the semiconductor directly to ground results in the by-passing of the inductive load. Without such inductive load, the protective semiconductor devices would again be operated in a linear mode forced to accommodate the short circuit current. As mentioned above, this would require oversize semiconductor devices for power handling capability.

Accordingly, it is an object of the present invention to provide a current control circuit for an inductive load such as a motor.

SUMMARY OF THE INVENTION

The present invention provides a circuit for limiting the maximum current through an inductive load such as a motor. Typically such circuits would be useful in an automotive environment for the protection of motors used in windshield wipers, blower fans, power steering units and automatic car leveling compressors.

Typically, in an automotive application, the control circuitry of the present invention would comprise a voltage source, usually the positive, ungrounded terminal of the vehicle battery and the associated ungrounded terminal of the vehicle generator. Such voltage source would be input to a divider circuit usually comprising semiconductor devices with resistive elements. Typically one of such resistive elements would be an adjustable resistor. One output from such divider circuit would supply the motor being controlled by the circuit. Another output from the divider circuit would be taken prior to a resistive element such that a voltage reading could be obtained. Such voltage would be directly proportional to the current through the motor, and such voltage would be input to a comparator circuit. The adjustable resistor would be set to accommodate the appropriate size of the semiconductor device protecting the motor by limiting the maximum current to which the motor could be subjected.

As the comparator circuit typically compares voltages, the second voltage input to the comparator circuit would be a preselected reference voltage corresponding to the maximum current to which the motor should be subjected. The output from the comparator would be a signal when the current to which the motor were actually being subjected would come within a selected margin from or exceed the preselected maximum current to which the motor is to be subjected. The output from the comparator circuit would be connected to a one shot multivibrator. The output from such one shot multivibrator would be utilized in a switching circuit arrangement to turn off the voltage input to the motor for a preselected time period. The pulse length of the multivibrator can be calculated to provide a maximum stall torque for the motor while providing a long enough turn off period to protect the motor. Typically such switching circuitry includes semiconductor devices. In fact, the turning off of the voltage supply to the motor is usually accomplished by turning off an appropriate semiconductor device in the divider circuit itself. The charging of the comparator from the input from the divider circuit is usually controlled by a capacitive element requiring an appropriate charging period.

In the application of the present control circuit to a motor, the motor load is inductive and accordingly the charging current would lag the voltage applied. Accordingly, for the time period that the voltage source would be turned on to the motor, it would take a relatively long time for the circuit to charge to the preselected current limit value. Once such preselected maximum value were reached, the pulse received by the switching circuit would cut off the voltage supply to the divider circuit supplying the motor which would quickly drop the current value. Because of such rapid drop in supply current, the off time for the supply to the motor would be short compared to the on time. This is a favorable arrangement as it would insure during starting or stalling that the motor would be supplying enough torque for its desired application. An especially desirable feature of the present invention would include the feature that when the inductive load of the motor would be by-passed or shorted such as when the output of the transistor is shorted directly to ground, the inductive time constant would be nearly zero providing for extremely fast current rise in the circuit. Accordingly, upon the supply of the voltage source across the motor, the pulse circuit would almost instantaneously provide a pulse disconnecting the voltage supply from the motor circuit virtually instantaneously upon the current reaching the preselecting limit. Accordingly the off time of the voltage supply to the motor under such conditions would be large and very little energy would need to be dissipated by the semiconductor device protecting the motor. In fact, the consecutive on and off pulses provided by the pulsing device would result in a series of current spikes supplied across the motor all limited to the preselected maximum current value. The power content of such a series of spikes would be very low and require minimal power dissipation by the semiconductor protecting device.

In particular, the present invention provides a control circuit comprising a voltage source, a divider circuit connected to said voltage source and including a semiconductor switching device, a voltage monitor connected to an output from said divider circuit, an inductive load connected to said divider circuit, a voltage comparator including a source of reference potential and an input from said voltage monitor, a pulse source connected to an output from said voltage comparator, a switching circuit including an input from said pulse source, said switching circuit capable of disconnecting said divider circuit voltage source input from said inductive load.

DESCRIPTION OF THE PREFERRED EMBODIMENT

Figure 1:
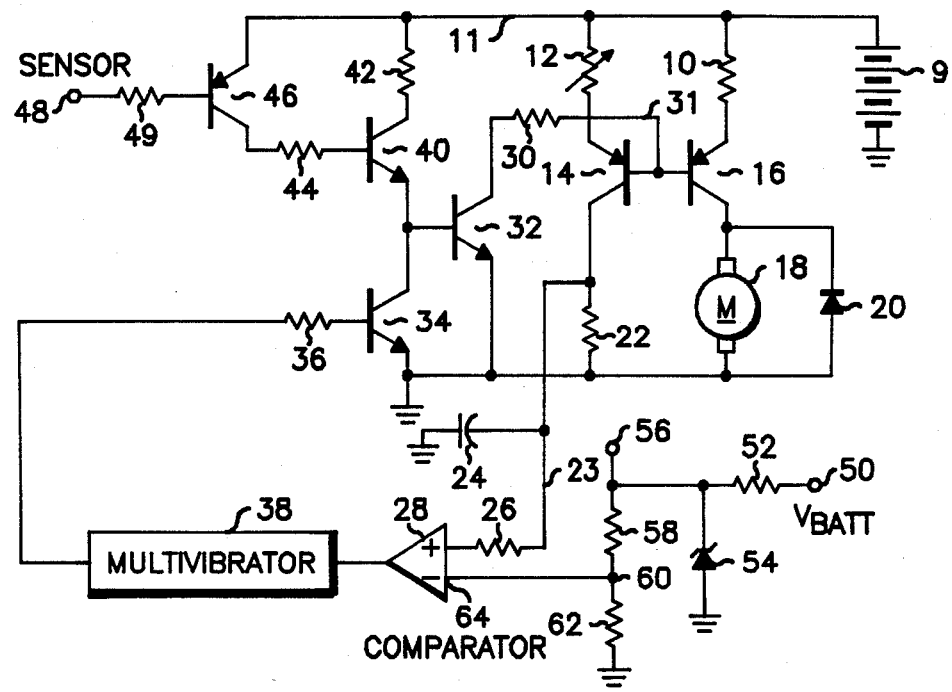
FIG. 1 is a schematic of a circuit configuration embodying the present invention.

Referring now to FIG. 1, a current control circuit in accordance with the present invention is shown. A voltage source is shown as battery 9 the positive side of which is connected to a voltage supply bus 11. Resistor 10 is connected at one end to supply 11 and at its other end to the emitter of transistor 16. A variable resistor 12 is also connnected at one end to supply 11 and at its other end to the emitter of transistor 14. The bases of transistors 14 and 16 are interconnected. The collector of transistor 16 supplies motor 18, with a diode 20 connected to the supply side of motor 18 for noise supression. Such noise supression consideration is desired in an automotive application of the present invention. The collector of transistor 14 is connected to ground through resistor 22 thereby enabling lead 23 to provide a voltage indication through resistor 26 to comparator circuit 28. A capacitor is also connected to lead 23 for desired rise time and filter considerations.

Comparator 28, as is typical of comparator circuits, compares one voltage value with another, providing an output when one value equals or exceeds the other. The other input to comparator 28 is a selected reference value initiating from voltage supply 50 which corresponds to the value delivered by battery 9. Such supply passes through resistor 52 and zener diode 54 connected to ground. The output from resistor 52 passes through a voltage divider circuit consisting of resistors 58 and 62. The reference voltage appears at 60 and enters comparator 28 at terminal 64. This reference voltage is selected to correspond to the preselected maximum desired value of current passing through motor 18.

The input through resistor 26 to comparator 28 is proportional to the actual current through motor 18 as can be seen from the following calculations.

The voltage value entering comparator 28 through resistor 26 corresponds to the voltage across resistor 22. In the following equations, $v_{22}$ corresponds to the voltage across resistor 22, $I_{10}$ corresponds to the current through resistor 10, $R_{10}$ corresponds to the value of resistor 10, $V_{BE16}$ corresponds to the voltage base to emitter of transistor 16, $V_{BE14}$ corresponds to the voltage base to emitter of transistor 14, $R_{22}$ corresponds to the value of resistor 22 and $R_{12}$ corresponds to the value of resistor 12.

$$V_{22} = \frac{I_{10}(R_{10}) + [V_{BE(16)} - V_{BE(14)}]}{R_{12}} \cdot R_{22}$$

$V_{BE(16)} - V_{BE(14)}$ = Fixed value (Constant) $\simeq$ 0 volts

As transistor 16 and 14 are mounted on the same heat sink, $R_{12}$ and $R_{22}$ are predetermined values, therefore $V_{22} \propto I_{10}$.

Accordingly, it is seen that the voltage across resistor 22 input to comparator 28 through resistor 26 is directly proportional to the current through resistor 10. As this corresponds to the current entering the emitter of transistor 16, when such transistor would be on, virtually this entire current would pass into motor 18. The amount of current passing through transistors 14 and 16 is adjustable by the adjustment of resistor 12. Adjustment of the value of resistor 12 permits the appropriate sizing of transistor 16 as to current carrying capability.

When the voltage input to comparator 28 through resistor 26 would exceed that input at 64 from the preselected reference voltage, comparator 28 would provide an output to a one shot multivibrator circuit 38. The reference voltage at 60 would be preselected to correspond to the maximum desired current through motor 18. Multivibrator 38 when turned on by an output from comparator 28 would itself provide an output pulse through resistor 36 to turn on transistor 34. Once conducting, transistor 34 would turn OFF transistor 32 which itself would cut off the base drive through resistor 30 to the common base connections of transistors 14 and 16 to turn off conduction of such transistors thereby cutting off the voltage supply to motor 18.

Figure 2:
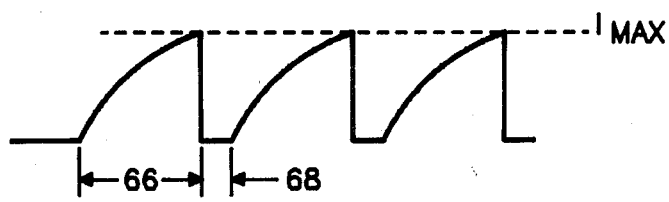
FIG. 2 is a current waveform supply to a normal inductive load by the circuitry of the present invention.

Referring now to FIG. 2, with motor 18 providing a normal inductive load, the current through resistor 10 and the emitter to collector current of transistor 16 would take a waveform similar to that shown in FIG. 2. The rise time of the current waveform would depend on the time constant of the inductive and resistive values of the circuit, and once the current rose to the preselected maximum value, the connection to the voltage source would be disconnected by the output of comparator 28 and the resulting pulse from multivibrator 38 which would turn off the conduction of transistors 14 and 16. Such off time would correspond with the pulse length from multivibrator 38 and is shown as length 68 in FIG. 2. Conduction would be started again by sensor 48 providing a signal through resistor 49 to turn transistor 46 on. In turn this would provide conduction through resistor 44 to turn transistor 40 on, thereby permitting current flow from source bus 11 through resistor 42 and transistor 40 to the base of transistor 32. Such pulse would provide a signal through resistor 30 and lead 31 to again permit conduction of transistors 14 and 16. The next rise time cycle of FIG. 2 would accordingly be initiated.

Figure 3:
FIG. 3 is a current waveform supply to a zero inductance load by the circuitry of the present invention.

In the event that motor 18 is shorted thereby having no inductive load, when transistor 16 would be turned on, virtually no rise time would be required for the current to reach its maximum value. The resultant waveform shown in FIG. 3 would be a series of spikes each of which would correspond to the sensor 48 turning on transistor 16, the current value reaching the preselected maximum value, and the conduction of transistor 16 being turned off by the signal from comparator 28 to multivibrator 38 and the resultant pulse from multivibrator 38 turning off the conduction of transistor 16.

The rise time of the current in FIG. 2 is known from the following inductive current equations, wherein I10 corresponds to the current through R10, and accordingly through transistor 16 in motor 18, $V_{11}$ corresponds to the voltage of source bus 11, and $\tau$ corresponds to the time constant of the inductive value of the circuit divided by the resistive value of the circuit.

$$I_{10} = V_{11}/R(1 - e_\tau^{-t}) \text{ where } \tau = L/R$$

Accordingly, the present invention is seen to provide a current control circuit providing protection for a motor even when the motor is shorted resulting in a zero inductance value for the supply circuit for value for the load circuit.

What is claimed is:

1. A control circuit comprising:
   (a) a voltage source;
   (b) a divider circuit having at least one input connected to said voltage source, said divider circuit further including a first transistor and a second transistor;
   (c) a voltage monitor connected to an output of said first transistor;
   (d) an inductive load connected to an output of said second transistor for connecting said inductive load to said voltage source;
   (e) a voltage comparator including a source of reference potential and an input from said voltage monitor;
   (f) a pulse source connected to an output from said voltage comparator; and
   (g) a switching circuit including an input from said pulse source, said switching circuit capable of controlling said divider circuit to selectively disconnect said inductive load from said voltage source.

2. The control circuit of claim 1 wherein the voltage output from said voltage monitor is proportional to the current through said inductive load.

3. The control circuit of claim 1 wherein said inductive load comprises a motor.

4. The control circuit of claim 2 wherein said source of reference potential comprises a voltage source and resistive elements selected to establish said reference potential so that said voltage comparator can compare the output from said voltage monitor with said reference potential to provide an appropriate output to said pulse source to enable said pulse source to provide an output to said switching circuit to disconnect said inductive load from said divider circuit voltage source when the output from said voltage monitor exceeds said reference potential.

* * * * *